(12) United States Patent
Nimberger et al.

(10) Patent No.: US 6,352,361 B1
(45) Date of Patent: Mar. 5, 2002

(54) TEMPERATURE SENSING DEVICE FOR METERING FLUIDS

(75) Inventors: Spencer M. Nimberger; Kevin J. Cessac, both of Houston, TX (US)

(73) Assignee: PGI International, Houston, TX (US)

(*) Notice: Subject to any disclaimer, the term of this patent is extended or adjusted under 35 U.S.C. 154(b) by 0 days.

(21) Appl. No.: 09/374,126

(22) Filed: Aug. 6, 1999

(51) Int. Cl.$^7$ .............................. G01K 13/02; G01K 1/08
(52) U.S. Cl. ...................... 374/142; 374/148; 374/165; 374/208; 73/204.11; 73/866.5
(58) Field of Search ................................ 374/148, 208, 374/178, 179, 183, 190, 194, 201, 165, 163, 187, 141, 142, 147; 73/866.5, 204.11, 204.12, 204.13; 136/230, 242

(56) References Cited

U.S. PATENT DOCUMENTS

| | | | |
|---|---|---|---|
| 4,749,415 A | | 6/1988 | Barton ........................ 136/230 |
| 5,046,857 A | * | 9/1991 | Metzger et al. ............. 374/208 |
| 5,048,323 A | | 9/1991 | Stansfeld et al. ........... 73/32 A |
| 5,071,259 A | * | 12/1991 | Metzger et al. ............. 374/183 |
| 5,111,691 A | | 5/1992 | John et al. .................... 73/292 |
| 5,632,556 A | * | 5/1997 | Sivyer ......................... 374/148 |
| 5,660,473 A | * | 8/1997 | Noma et al. ................. 374/208 |
| 5,674,009 A | * | 10/1997 | Stark ........................... 374/209 |
| 5,720,556 A | * | 2/1998 | Krellner ...................... 374/208 |
| 5,743,646 A | * | 4/1998 | O'Connell et al. ......... 374/148 |
| 5,773,726 A | * | 6/1998 | Mahoney et al. ......... 73/861.65 |

FOREIGN PATENT DOCUMENTS

| | | | |
|---|---|---|---|
| CH | 647 867 A | | 2/1985 |
| DE | 243407 A3 | * | 3/1987 |
| DE | 91 00 632 U | | 4/1991 |
| EP | 1074825 A1 | * | 2/2001 |
| GB | 2048474 A | * | 12/1980 |
| GB | 2269902 A | * | 2/1994 |
| JP | 60 166831 A | | 8/1985 |

OTHER PUBLICATIONS

"Thermowells", Century Machine Company Limited, Pamphlet published 8/87, pp. 1–8.
"Mac–Weld Machining & Manufacturing Ltd.", Pamphlet Published prior to 1/98, pp. 1–16.

* cited by examiner

Primary Examiner—Diego Gutierrez
Assistant Examiner—Stanley J. Pruchnic
(74) Attorney, Agent, or Firm—Browning Bushman

(57) ABSTRACT

A thermowell assembly (20) shown in FIG. 2 is positioned in a pipeline (10) for sensing the temperature of the fluid medium in the pipeline (10) for transmitting the sensed temperature to a meter (12). A temperature sensing probe is received within a temperature conducting tube (36) forming a thermowell and having a plurality of annular fins (40) extending thereabout. In the embodiments of FIGS. 1–7, a liquid (50) is provided in an annular space between the thermocouple (28) and the temperature conducting tube (36). Non-metallic members (70, 28, 80) are positioned between the pipeline (10) and the temperature transmitting tube (36) to isolate thermocouple (28) from ambient changes in the temperature of metal pipeline (10) which may result in an error in the temperature of the flow medium sensed by the thermowell assembly (20). High temperature embodiments shown in FIGS. 4 and 5 do not contain any non-metal components and provide a minimal metal to metal contact between the metallic temperature conducting tube (36B) of the thermowell (20B) and the adjacent metal mounting structure (52B, 62B). The embodiments shown in FIGS. 8–12 illustrate a temperature sensing probe comprising a temperature sensing assembly (80F, 80G) mounted within the internal bore (37F, 37G) of the finned tube (36F, 36G). The temperature sensing assembly (80F, 80G) includes a carrier (82F, 81G) with epoxy (96F, 96G) mounting a temperature sensing element (93F, 82G) within the carrier (82F, 81G).

62 Claims, 13 Drawing Sheets

TEMPERATURE SENSING DEVICE FOR METERING FLUIDS

FIELD OF THE INVENTION

This invention relates generally to a temperature sensing device for metering fluids, and more particularly to a temperature sensing device injected within a conduit for a flowing fluid medium in which the volume of flow is being metered or measured.

BACKGROUND OF THE INVENTION

In fluid metering, the temperature of the flowing medium is an important element or parameter in determining accurately the volume of flow. Normally the conduit includes an orifice through which the fluid medium flows and a suitable fluid meter measures the fluid pressure on opposed sides of the orifice. Flow velocity, line pressure and temperature are necessary in order to measure accurately the flow of the fluid medium through the conduit. If the temperature of the fluid medium is not correct, the calculated flow volume by the meter which includes a computer processing unit (CPU) will be inaccurate.

In measuring the gas flow through a gas pipeline, for example, in which the gas flow volume is utilized to effect payment of gas being purchased, an inaccuracy in the temperature of the flowing gas may result in substantial monetary sums being paid or not being paid for delivered gas resulting from an error in the temperature of the flowing gas. Thus, it is highly important that an accurate temperature measurement be obtained for the flowing gas.

A thermowell assembly which comprises a temperature sensing probe (TSP) received within an outer metallic sheath or tube is commonly used for injecting within the pipeline. A thermowell is used so that a temperature sensing probe (TSP) may be easily removed from the thermowell and replaced. Pipelines normally are buried within the ground but a length portion of the pipeline commonly extends above the ground for mounting of a meter to calculate the flow volume of the fluid transported in the pipeline. While the ground maintains a generally uniform temperature, the pipeline section above the ground is exposed to ambient conditions which may vary greatly. Variations in temperature of the exposed pipeline sections results in a temperature conduction from the metallic pipeline to the metallic thermowell assembly which may result in an inaccurate temperature measurement of the flowing medium.

U.S. Pat. No. 4,510,343 dated Apr. 9, 1985 shows a thermowell apparatus having a thermocouple mounted within an outer closed metallic tube or sheath and extending within a pipe. The outer closed tube or sheath is positioned closely adjacent a metallic pipe and an outer metallic housing mounted on the pipe. Thus, temperature from the pipe exposed to ambient conditions is conducted to the outer tube of the thermowell which may result in an error in the temperature of the fluid flow under certain conditions.

U.S. Pat. No. 5,048,323 dated Sep. 17, 1991 is directed to a sensor for line pressure and line temperature including a sealed chamber containing a fixed mass of a reference gas. A vibrating quartz density sensor produces an output signal.

It is desirable that a thermowell assembly be provided for a metallic conduit which is substantially temperature insulated or isolated from the metallic conduit so that any temperature inaccuracies of the sensed flowing medium are minimized or eliminated.

SUMMARY OF THE INVENTION

The present invention is directed to a thermowell assembly extending within a metallic fluid conduit in a direction perpendicular to the direction of flow to a position past the axial centerline of the metallic conduit. The thermowell assembly includes a temperature sensing probe received within an outer metallic sheath or closed tube. The outer metallic tube which has a closed inner end is exposed to the fluid flowing through the conduit and a plurality of spaced annular ribs or fins extend within the conduit about the outer periphery of the tube for improved temperature conductivity to the temperature sensing probe. The relatively large surface area of the fins improves the rate of temperature transfer by the fins.

The temperature sensing probe includes a temperature sensing element which is received within a thermowell and may comprise various embodiments for the temperature sensing element, such as a thermocouple, a resistance temperature device, a thermometer, a thermistor, and a semiconductor sensor, for example. However, it is understood that other embodiments for temperature sensing elements may be utilized for the present invention and the term "temperature sensing probe" as used in the specification and claims herein is to be interpreted for all purposes as including all suitable embodiments of a temperature sensing element received within a thermowell of the thermowell assembly of the present invention for sensing the temperature.

One embodiment of the temperature sensing probe comprises a TSP and tube of a cylindrical cross section with an annular space formed therebetween of a relatively small width or thickness. The annular space adjacent the fins of the thermowell assembly is filled with a temperature conductive liquid for improved temperature conductivity between the outer peripheral surface of the TSP and the adjacent inner peripheral surface of the thermowell assembly. The annular space above the annular fins is filled with air which acts to thermally insulate the TSP from the thermowell assembly.

The metallic mounting structure for the thermowell assembly has a lower externally threaded metal housing for mounting the thermowell assembly onto the metallic conduit. The metal conduit or pipe has an internally threaded metal cap thereon and the lower metal housing is threaded onto the metal cap. Thermal insulating members in many embodiments, such as thermoplastic fittings or members, are positioned between the metal tube and adjacent metallic mounting members so that no metal to metal contact is provided against the tube thereby minimizing thermal increase or loss from the metal tube. As a result, a highly accurate temperature sensing device has been provided.

Also, one embodiment of the invention is designed particularly for high fluid temperatures and does not contain any non-metallic members therein. A minimal metal-to-metal contact is provided between the metal tube of the thermowell assembly and the adjacent metal mounting structure.

Another embodiment of the temperature sensing probe comprises a temperature sensing assembly mounted within the lower end portion of the internal bore of a finned tube which forms a thermowell within the conduit. The TSP is inserted within the thermowell and held therein by mechanical screw threads through or by a compressive force acting against the TSP. The TSP includes an outer carrier formed of a highly thermal conductive material and a temperature sensing element secured within the carrier by an epoxy material about the sensing element and about a wire connection to the sensing element. Fins on the thermowell tube have an outer diameter slightly less than the diameter of the opening in the conduit wall receiving the thermowell assembly.

An object of the invention is the provision of a temperature sensing device for metering fluid and is injected within a conduit for a flowing fluid medium to obtain an accurate temperature measurement for the flowing fluid.

An additional object of the invention is the provision of such a temperature sensing device including a thermowell assembly having a temperature sensing probe mounted within a temperature transfer metallic tube which is thermally insulated from the metallic conduit.

A further object of the invention is the provision of a TSP secured within the internal bore of a finned tube and including a temperature sensing element.

Another object of the invention is the provision of a temperature sensing device having a fast thermal response to temperature changes in the conduit fluid.

Other objects, features and advantages will be apparent from the following specification and drawings.

BRIEF DESCRIPTION OF THE DRAWINGS

FIG. 1A is an example of a prior art metallic thermowell assembly mounted on a metallic conduit or pipe;

DESCRIPTION OF THE PREFERRED EMBODIMENTS

Figure 1:
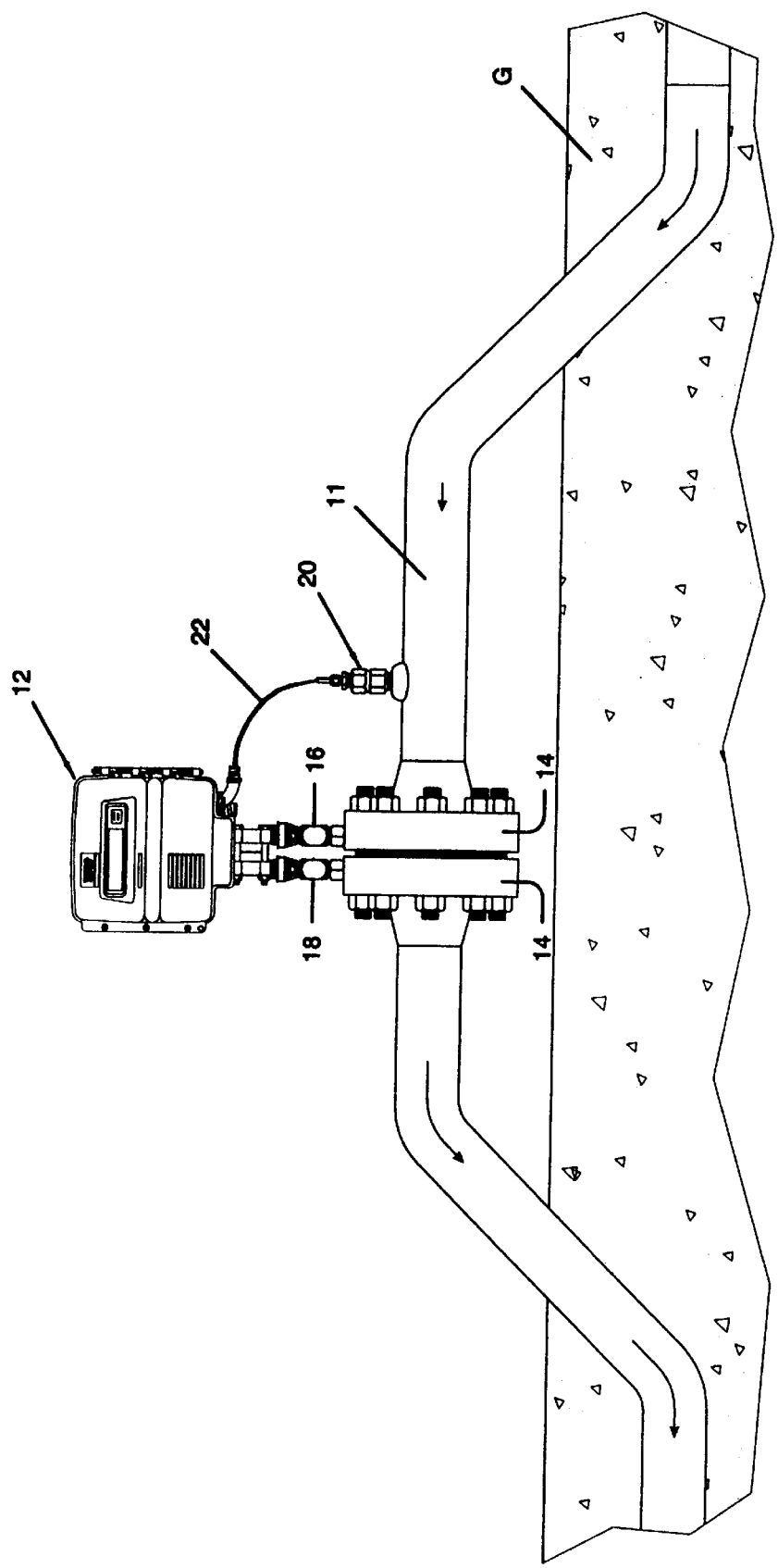
FIG. 1 is a generally schematic view of the invention illustrating one use of the thermowell assembly comprising the present invention with a gas pipeline having a gas meter in fluid communication with opposite sides of an orifice in the pipeline to measure the fluid pressure differential across the orifice and thermowell assembly connected to the meter to sense the temperature of the flowing gas.
Figure 1:
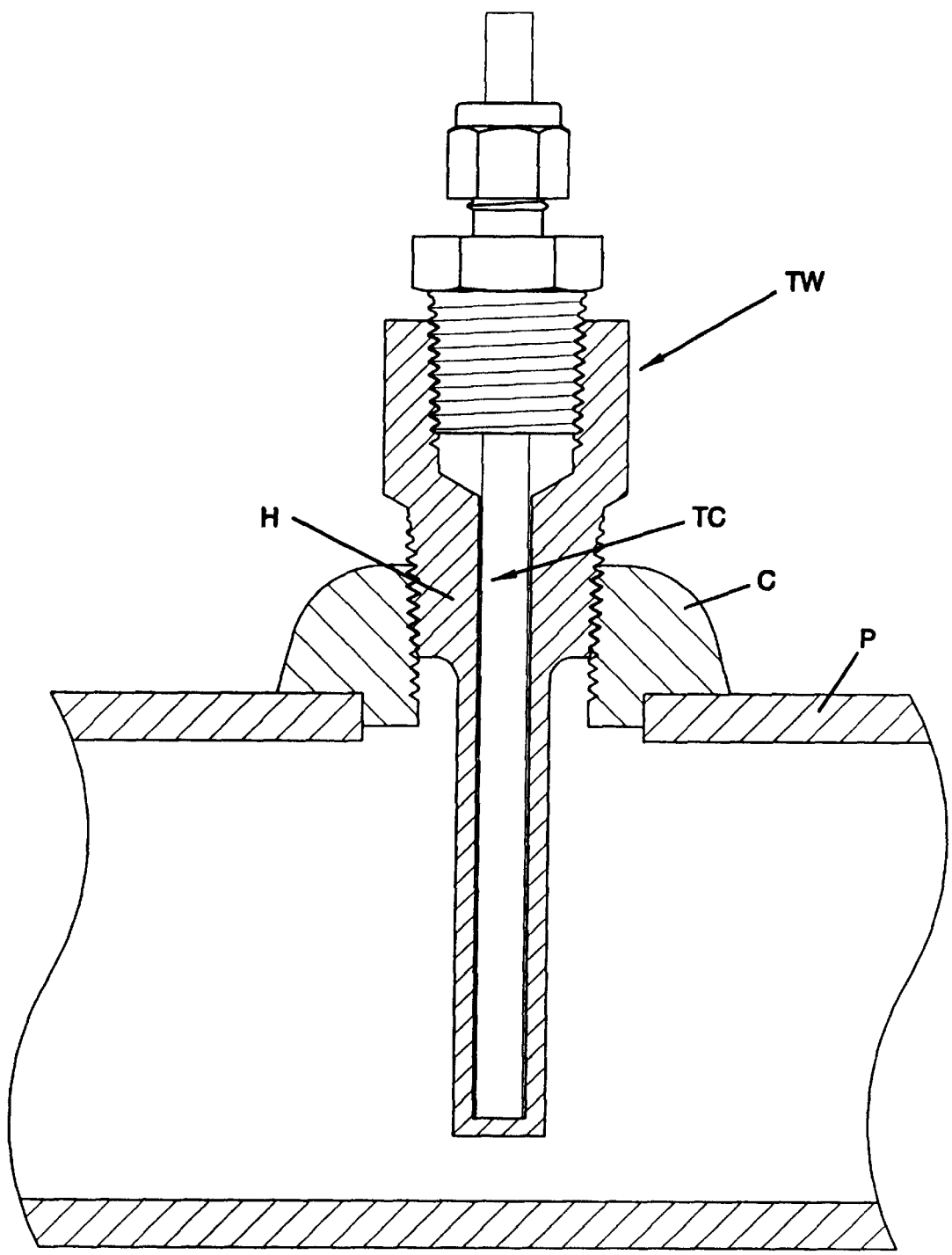

Referring now to the drawings for a better understanding of this invention, and more particularly to FIG. 1, a gas pipeline 10 is shown buried within the ground G. For metering or measuring the volume of gas flowing through pipeline 10, a pipeline section 11 extends above ground G and a gas meter generally indicated at 12 is mounted on pipeline section 11. An orifice plate (not shown) is mounted between flanges 14 and contains an orifice of a predetermined size for the flow of gas therethrough. High fluid pressure from the upstream side of the orifice is transmitted by line 16 to meter 12 and low fluid pressure from the downstream side of the orifice is transmitted by line 18 to meter 12 as well known. Meter 12 includes a computer processing unit (CPU) and fluid flow velocity, fluid pressure, and temperature are sensed for calculating the volume of gas flowing through pipeline 10. A thermowell assembly is shown generally at 20 for sensing the temperature of gas pipeline 10. The sensed temperature from thermowell assembly 20 is transmitted to meter 12 by a hard wire connection 22.

Referring to FIG. 1A, a prior art thermowell assembly TW is shown in pipeline P having a temperature sensing probe (TSP) TC therein. Thermowell assembly TW has a metallic body or housing H threaded on metallic weld flange C on metallic pipeline P. When pipeline P is exposed to very high or very cold ambient conditions, the temperature from pipeline P is conducted by metallic weld flange C and metallic housing H to temperature sensing probe (TSP) TC and may produce an inaccurate sensing of the true temperature of the flowing gas in pipeline P.

To illustrate the magnitude of an error in sensing the correct temperature of a flowing gas by the prior art, the following tables show the result of such an error.

TABLE 1

ORIFICE METER
3" LINE
1.5" ORIFICE DIA.
ΔP 100" H₂O
SPECIFIC GRAVITY = .6
BAROMETRIC PRESSURE - 14.7 psi

ONE HOUR FLOW AT

| TEMP. F. | 200 psi MCF | ΔMCF (Error) | 50 psi MCF | ΔMCF (Error) |
|---|---|---|---|---|
| 0 | 97.36 | 2.32 | 51.81 | 1.11 |
| 20 | 95.04 | 2.14 | 50.70 | 1.04 |
| 40 | 92.90 | 1.99 | 49.66 | .97 |
| 60 | 90.91 | 1.84 | 48.69 | .92 |
| 80 | 89.07 | 1.73 | 47.77 | .87 |
| 100 | 87.39 | | 46.90 | |

TABLE 2

PD METERS OR TURBINES
3" LINE
SPECIFIC GRAVITY = .6
BAROMETRIC PRESSURE = 14.7 psi

| TEMP F. | SCFM @ 200 psi | ΔMCF PER HOUR (Error) | SCFM @ 50 psi | ΔMCF PER HOUR (Error) |
|---|---|---|---|---|
| 0 | 3210 | 9.2 | 774 | 2.0 |
| 20 | 3058 | 8.7 | 741 | 1.86 |
| 40 | 2921 | 7.5 | 710 | 1.62 |
| 60 | 2796 | 6.8 | 683 | 1.56 |
| 80 | 2683 | 6.2 | 657 | 1.44 |
| 100 | 2579 | | 633 | |

If the price of gas is $2.00 per 1 MCF, a substantial monetary sum would result in such an error on a weekly or monthly basis.

2–7 show various embodiments of the thermowell assembly comprising the present invention which are designed to isolate thermally and/or electrically the TSP from the metallic pipeline so that accurate temperature readings of the flow medium are transmitted to the meter.

Figures 2, 2A, 2B:
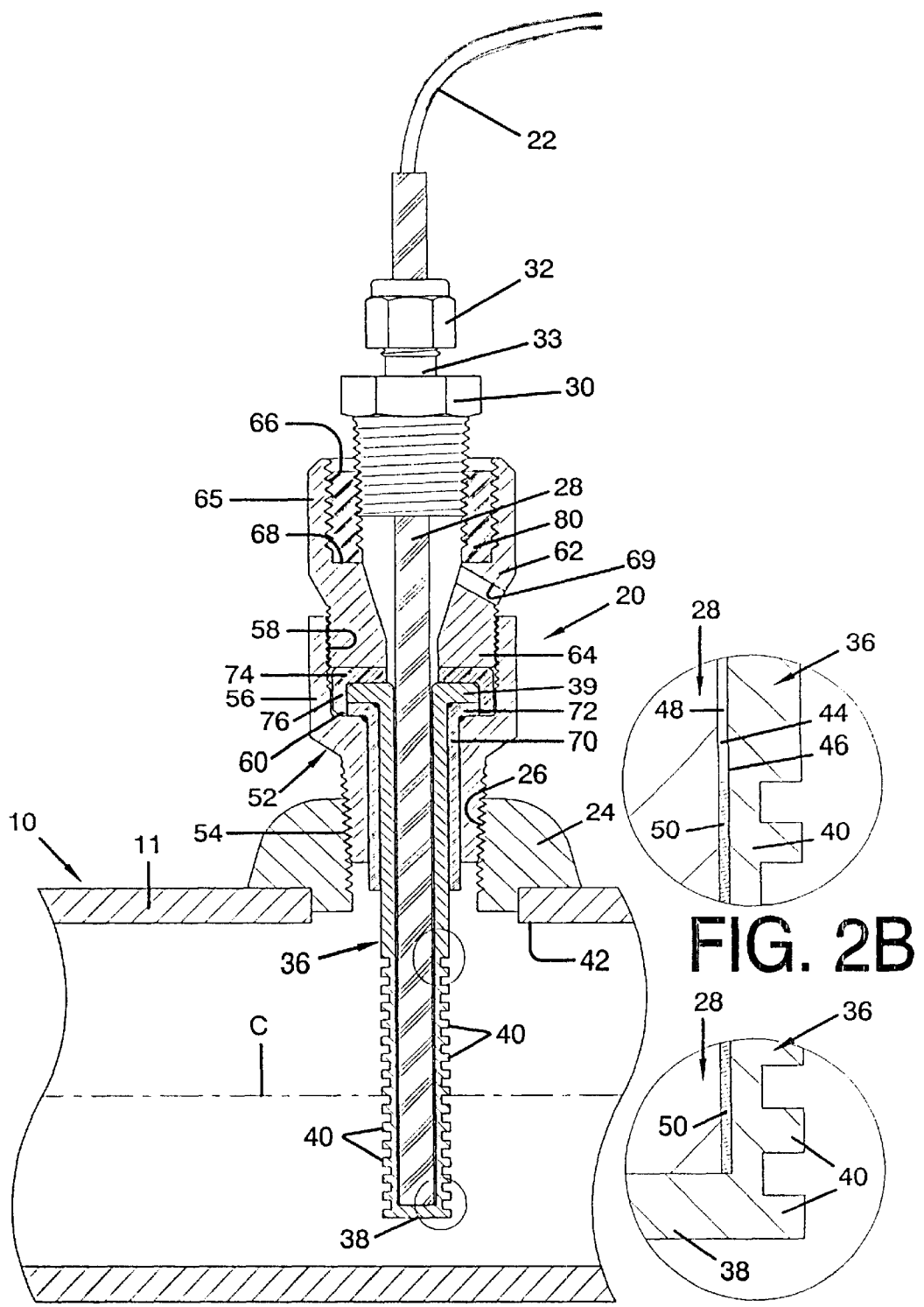
FIG. 2 is an enlarged sectional view of the thermowell assembly shown in FIG. 1 for illustrating the present invention.
FIG. 2A is an enlarged fragment of FIG. 2 showing the lower circled portion of FIG. 2.
FIG. 2B is an enlarged fragment of FIG. 2 showing the upper circled portion of FIG. 2.

Embodiment of FIG. 2

Referring now particularly to the embodiment of FIG. 2, a thermowell assembly generally indicated at 20 is illustrated as mounted on pipeline section 11 of pipeline 10 above the ground. Pipeline section 11 has a mounting weld flange 24 secured thereon and having internal threads 26 defining a central bore. Thermowell assembly 20 includes a TSP generally indicated at 28 having an externally threaded upper mounting plug 30. TSP 28 consists of various temperature sensing devices as previously mentioned and covered by a high alloy metal sheath as well known. A nut 32 threaded onto extension 33 of plug 30 is effective for connecting TSP 28 to plug 30. Connection 22 extends to meter 12 to transmit the sensed temperature of the flowing gas in pipeline 10 to meter 12. A suitable TSP described as Style RK is sold by Watlow Gordon of Richmond, Illinois. Thermowell assembly 20 includes a thermowell defined by an external temperature transmitting housing or tube generally indicated at 36 for transmitting or conducting the temperature of the flowing gas to TSP 28. Temperature conducting tube 36 formed of a high thermal conductivity material, such as hard anodized aluminum, has a closed lower end 38 to form the thermowell and includes a flange 39 on its upper end. Tube 36 projects within pipeline 10 past the longitudinal axis or centerline C of pipeline 10. To provide a relatively large surface area contact with the flowing gas, a plurality of spaced annular ribs or fins 40 are provided about housing 36 and extend to a position near the upper wall or inner peripheral surface 42 of pipeline 10. As shown in FIGS. 2A and 2B particularly, an annular space 44 is formed between the outer peripheral surface 46 of TSP 28 and inner peripheral surface 48 of outer housing 36. Annular space 44 extending to the uppermost rib 40 as shown in FIG. 2B is filled with a liquid 50 to provide improved temperature transfer between surfaces 46 and 48. The lower end 52 of TSP 28 contacts closed end 38 in metal to metal contact for temperature transfer. The annular space 44 above liquid 50 as shown in FIG. 2B is filled with air.

For mounting TSP 28 and temperature transfer tube 36 onto pipeline 10, a metallic mounting structure is provided including a lower metallic mounting housing generally indicated at 52 and externally threaded at 54 adjacent the lower end. A large diameter upper housing portion 56 is internally threaded at 58 and has an inner annular shoulder or abutment 60. A bowl-shaped upper metallic mounting housing generally indicated at 62 has an externally threaded lower end 64 threaded within lower housing 52. A large diameter upper housing portion 65 is internally threaded at 66 and has an internal annular abutment or shoulder 68. A safety weep hole or opening 69 is provided. The temperature of metal pipeline 10 is transferred to weld flange 24, lower metal housing 52, and upper metal housing 62. It is desired that TSP 28 and temperature transfer tube 36 be isolated thermally from pipeline 10 so that an accurate temperature sensing of the flowing gas is transmitted to meter 12 from TSP 28. For that purpose, non-metallic isolation members are provided between pipeline 10, TSP 28 and tube 36. For thermal isolation of closed end tube 36, a plastic sleeve 70 having an upper flange 72 fits about tube 36 with flange 76 fitting between flange 39 and shoulder 60. An inverted cup-shaped isolation member 74 formed out of a suitable plastic material fits over and alongside flange 39 to prevent contact of flange 39 with upper metal housing 62 and lower metal housing 52. Downwardly extending flange 76 extends alongside flange 39. Thus, isolation members 70, 74 provide for thermal isolation of temperature transfer tube 36 and may be formed of various materials such as Delrin, Peek, UHMW, Rylon, and nylon.

For electrical isolation of TSP 28, a plastic sleeve 80 formed of a dielectric material is threaded within upper metallic housing 62 and abuts shoulder 68. Metallic plug 30 is threaded within sleeve 80. Sleeve 80 thus isolates TSP 28 electrically from upper housing 62. Sleeve 80 is preferably formed of a dielectric material such as Delrin, Peek, UHMW, Rylon, and nylon.

Figure 3:
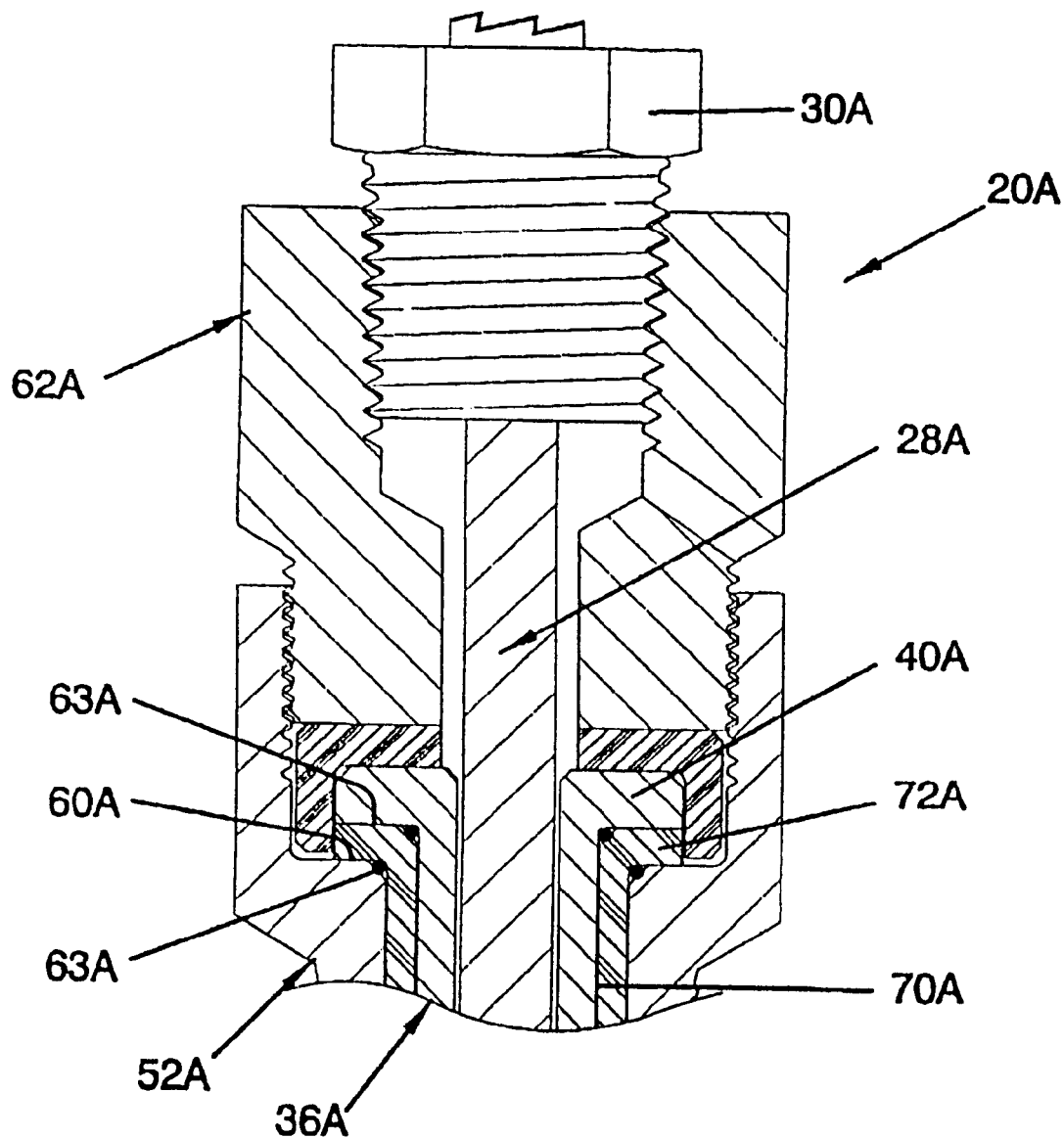
FIG. 3 is an embodiment similar to FIG. 2 but omitting the upper dielectric plastic sleeve between the TSP and the adjacent metallic mounting housing.

Embodiment of FIG. 3

Referring to FIG. 3, thermowell assembly 20A is shown including a TSP 28A. The electrical isolation sleeve shown in the embodiment of FIG. 2 has been omitted from the embodiment of FIG. 3. Metal end plug 30A of TSP 28A is threaded within upper metal housing 62A without any separate members positioned between plug 30A and upper housing 62A. The opposed planar surfaces of flange 72A on sleeve 70A are sealed against mating surfaces defined by shoulder 60A of housing 53A and flange 40A of tube 36A. Housing 62A is effective for applying a compressive force against the mating sealing surfaces. In addition, O-rings 63A are effective to provide additional sealing between the mating surfaces. This sealing arrangement along with the remainder of thermowell assembly 20A is identical to the embodiment of FIG. 2.

Figure 4:
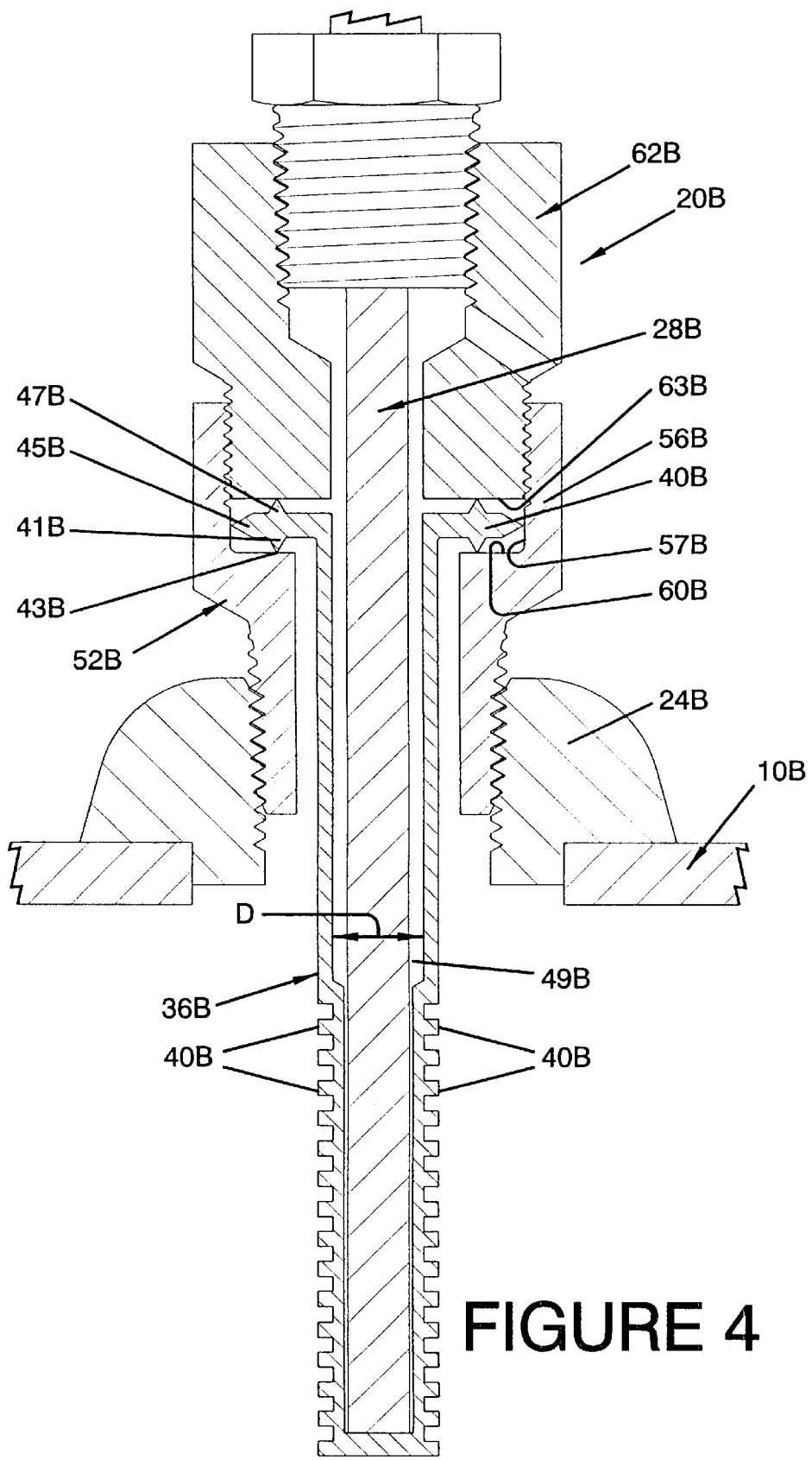
FIG. 4 is a sectional view of a modified high temperature thermowell assembly particularly for very high temperatures and not utilizing any non-metallic members or elements.

Embodiment of FIG. 4

The embodiment of thermowell assembly 20B shown in FIG. 4 is designed particularly for high temperatures above 400F and does not contain any non-metallic members. TSP 28B is received within upper metallic housing or plug 62B. Upper metallic housing or plug 62B is threaded within lower metallic housing 52B. Lower housing 52B is threaded within weld flange 24B on pipeline 10B.

Closed end tube 36B has an upperflange 40B fitting between shoulder 60B of lower housing 52B and the lower end 63B of plug 62B. Upper housing or cup portion 56B of lower housing 52B has an inner peripheral surface 57B. Flange 40B has a lower annular projection 41B of a triangular cross section to define a relatively sharp edge 43B engaging abutment 60B in a knife edge relation for sealing contact with abutment 60B. An annular side projection 45B of a triangular cross section is effective for positioning closed tube 36B within upper housing portion 56B on abutment 60B. Upper annular projection 47B of a triangular cross section is effective for contacting lower end 63B of plug 62B for gripping tube 36B between lower and upper housings 52B and 62B. By providing knife edge contact between metal tube 34B and metal housings 52B, 62B, minimal thermal transfer is provided by such contact.

Closed end tube 36B has an increased internal upper diameter D above annular ribs 40B. The annular space 49B above ribs 40B is filled with air to provide insulation.

Figure 5:
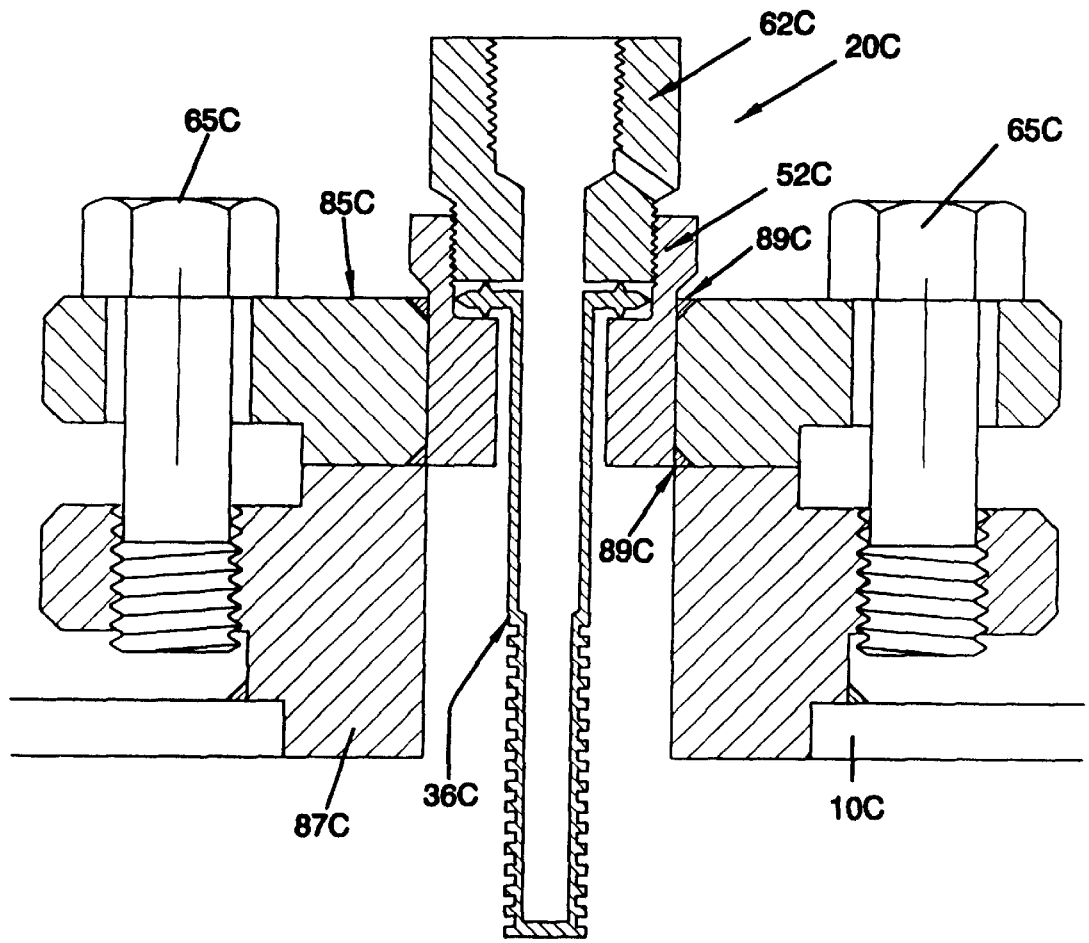
FIG. 5 illustrates a high temperature thermowell assembly similar to the thermowell of FIG. 4 but illustrating a mounting flange for connection to a mating flange.

Embodiment of FIG. 5

The embodiment of FIG. 5 is generally identical to the embodiment of FIG. 4, except in regard to mounting thermowell assembly 20C onto pipeline 10C. A mounting flange generally indicated at 85C is arranged for mounting on a mating flange 87C on pipeline 10C. Flange 85C is welded at 89C to lower housing 52C. Closed tube 36C is secured between housings 52C and 62C. Multiple fasteners 65C connect flanges 85C and 87C.

Figure 6:
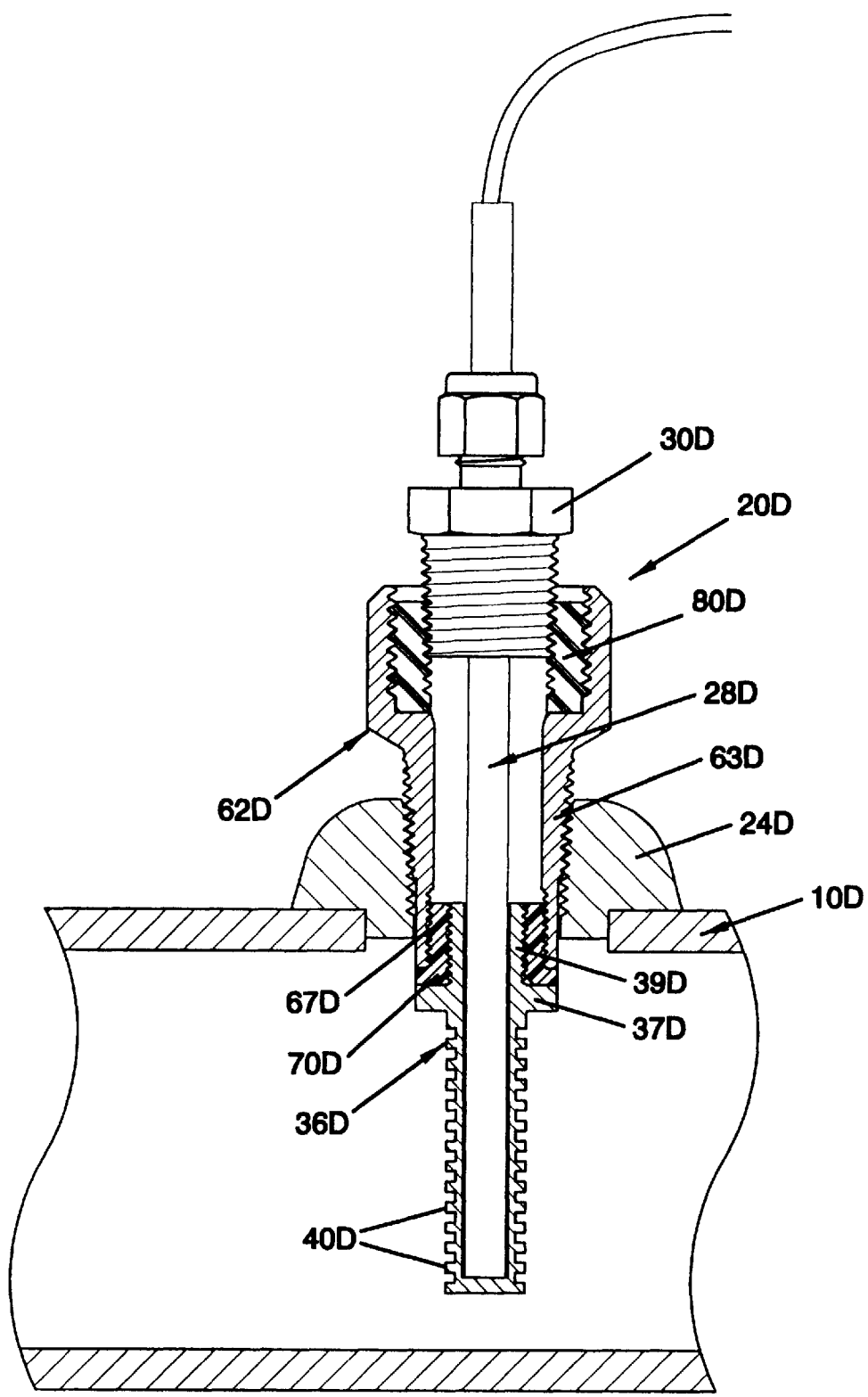
FIG. 6 is an embodiment generally similar to the embodiment in FIG. 2 but showing a modified mounting structure for the closed end metallic tube receiving the TSP.

Embodiment of FIG. 6

The embodiment of thermowell assembly 20D of FIG. 6 provides for both thermal and electrical isolation. The electrical isolation is provided by dielectric sleeve 80D to a position between metal plug 30D of TSP28D and upper mounting housing 62D which is similar to the embodiment of FIG. 2. Housing 62D has an externally threaded lower end portion 63D threaded within weld flange 24D of pipeline 10D. Lower end portion 63D has an internally threaded lower end 67D.

Closed tube 36D has an annular flange 37D above annular ribs 40D and an externally threaded upper end portion 39D above flange 37D. A plastic thermal isolation sleeve 70D is mounted between upper end portion 39D and threaded lower end 67D of housing 62D thereby to isolate tube 36D thermally from weld flange 24D and pipeline 10D. The arrangement of FIG. 6 provides a compact thermowell with a minimum of separate members.

Figure 7:
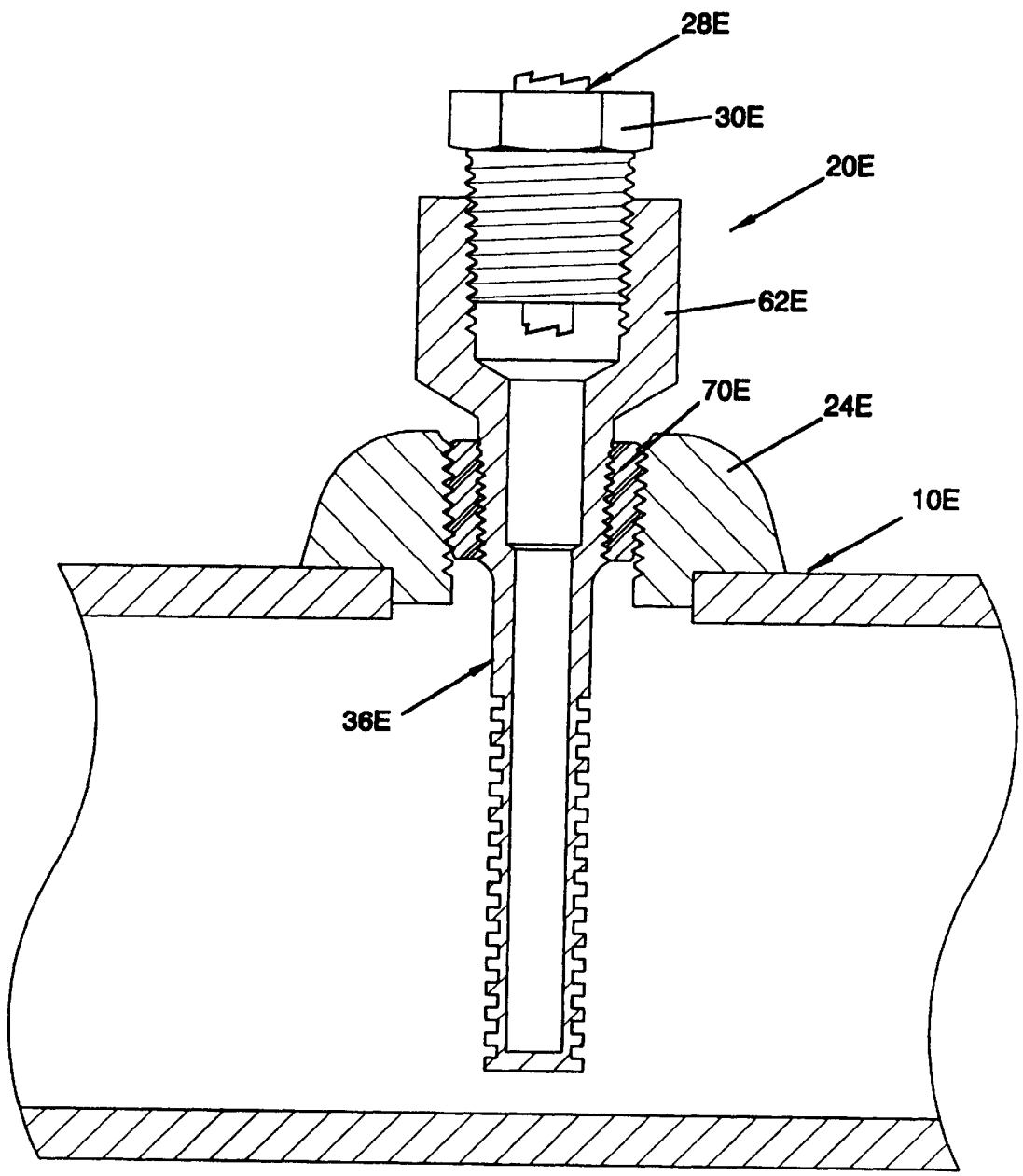
FIG. 7 is a simplified embodiment of the thermowell assembly showing a single plastic adaptor between the metallic thermowell assembly and the adjacent metallic cap of the metal pipeline.

Embodiment of FIG. 7

The embodiment of FIG. 7 is a simplified arrangement in which thermowell assembly 20E has a housing 62E for TSP 28E. Plug 30E is threaded within upper metal housing 62E. Closed end tube 36E is integral with upper housing 62E and extends downwardly within pipeline 10E. A cap 24E is secured to pipeline 10E.

A sleeve 70E is both internally and externally threaded for being positioned between cap 24E and housing 62E. Sleeve 70E is formed of a plastic material and provides both dielectric and thermal isolation for thermowell assembly 20E and TSP 28E. The embodiment of FIG. 7 is particularly designed for relatively low fluid pressures in pipeline 10E such as a pressure below about 10 psi.

Embodiments of FIGS. 8–12 Generally

The embodiments of FIGS. 8–12 are directed to various assemblies for securing a temperature sensing probe within the lower end portion of a closed end tube defining a thermowell extending within the conduit for sensing the temperature of the flowing fluid. Such assemblies as shown in FIGS. 8–12 include a small length carrier and a temperature sensing element secured within the carrier by an epoxy and have been very effective in reducing any error in sensing the temperature of the flowing fluid to a minimum. The relatively small length carrier of the embodiment of FIGS. 8–12 does not have an outer metal sheath as shown in the embodiments of FIGS. 1–7 which extends to the upper fittings of the thermowell assembly. Thus, any temperature sensing error resulting from the transfer of pipeline temperature to an outer metal sheath is eliminated or minimized by the embodiments of the temperature sensing probes of FIGS. 8–12.

Figure 8:
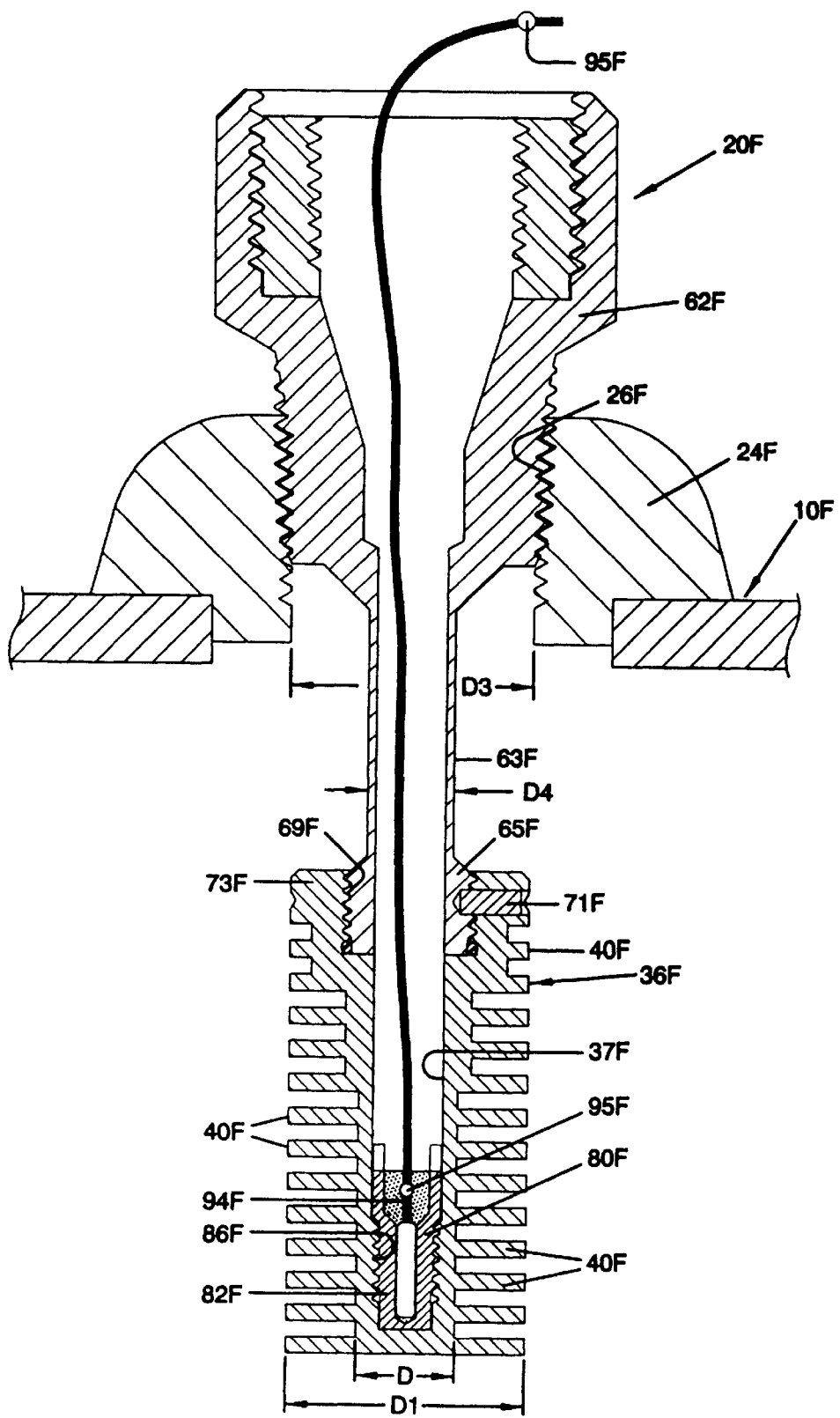
FIG. 8 is a sectional view of a separate embodiment of the invention showing a temperature sensing assembly mounted within the internal bore of a finned tube.
Figure 9:
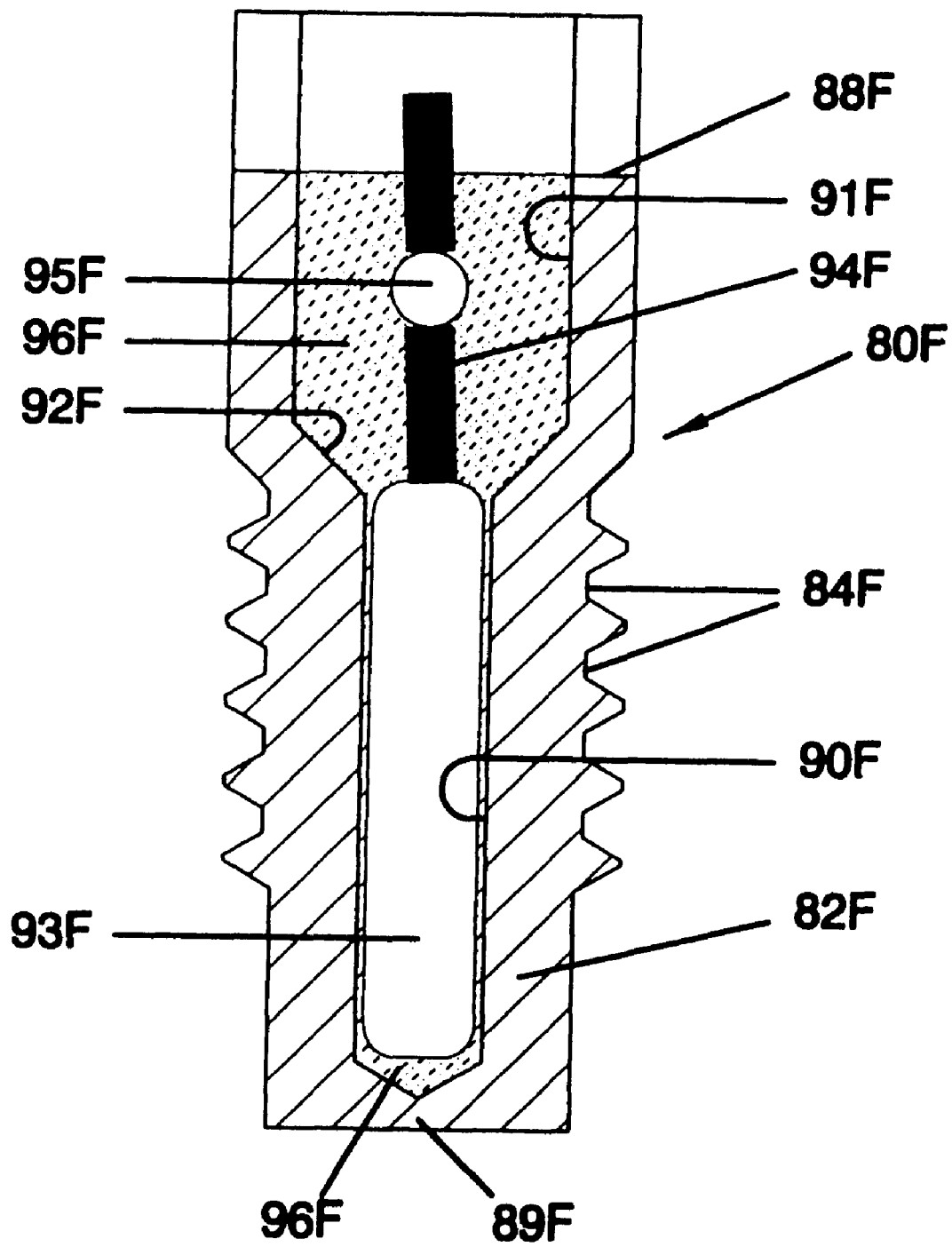
FIG. 9 is an enlarged sectional view of the temperature sensing assembly shown in FIG. 8 removed from the finned tube.

Specific Embodiment of FIGS. 8 and 9

The embodiment of FIGS. 8 and 9 shows conduit 190F with a weld flange 24F defining an internally threaded opening 26F for mounting the thermowell assembly indicated generally at 20F. Thermowell assembly 20F has an externally threaded upper housing 62F threaded within internally threaded opening 26F. A small diameter thin wall tubular member 63F extends from housing 20F and has an enlarged diameter externally threaded lower end 65F.

A closed end tube 36F has an internal bore 37F forming a thermowell and is internally threaded at 69F adjacent its upper end for threading onto the lower end 65F. A set screw 71F releasably locks tube 36F on lower end 65F. Closed end tube 36F has a generally cylindrical body 73F and a plurality of annular fins 40F extend about body 73F. The external diameter D1 of fins 40F is at least about 50 percent greater than the outer diameter D of body 73F. For best results, diameter D1 is preferably over twice the diameter D of body 73F. Threaded opening 26F has a diameter D3 and diameter D1 for fins 40F is only slightly less than diameter D3. Thus, the diameter D1 of fins 40F is at a maximum dimension for maximum thermal conductivity. Tubular member 63F has a low thermal conductivity such as between 4 and 15 BTU/Ft. Hr/Ft$^2$/° F. and is formed of a thin wall and a small diameter. Tubular member 63F is preferably formed of a heat resisting high alloy material, such as 316 stainless steel. The diameter D3 of opening 26F is at least about twice the external diameter D4 of tubular member 63F and preferably about three times external diameter D4 for best results.

The temperature sensing assembly or probe generally indicated at 80F is inserted within bore 37F of finned tube 36F and is shown particularly in FIG. 9. Assembly 80F has an outer carrier 82F with external screw threads 84F for engaging internal screw threads 86F in bore 37F. A slotted upper end 88F permits the use of a tool to install carrier 80F within bore 37F. Carrier 80F has a closed end 89F and a central bore defining a small diameter bore portion 90F and a large diameter bore portion 91F connected by a tapered shoulder 92F. A temperature sensing element 93F is mounted within small diameter bore portion 90F and has a wire connection 94F secured thereto. Wire connection 94F includes a plurality of electrical leads and is soldered at 95F to other wire sections for transmission of the temperature sensed by element 93F to a suitable instrument for calculating the volume of fluid flow.

To secure temperature sensing element 93F and wire connection 94F within carrier 82F, a thermal conductive epoxy 96F, such as Omega Engineering, Part No. OB-200-16, is positioned in bore portions 90F and 91F about temperature sensing element 93F and wire connection 94F. The epoxy material after mixing forms a strong, hard, electrically insulated adhesive for securement of temperature sensing element 93F.

Carrier 82F is formed of a material having a high thermal conductivity between about 80 and 200 BTU/Ft. Hr/Ft$^2$/° F. A material which has been found to be satisfactory is a hard anodized aluminum material designated as 6061-T6. The temperature sensing assembly 80F has been found to be highly effective in reducing any error in sensing the correct temperature of the flowing fluid to a minimum.

Carrier 82F and temperature sensing element 93F are formed of a highly thermal conductive material and the mechanical connection provided by screw threads 84F is effective in enhancing the thermal transfer from finned tube 36F to carrier 82F and sensing element 93F. Also, carrier 82F and sensing element 93F are secured entirely within the lower end portion of internal bore 37F which forms the thermowell. Thus, carrier tubes for the temperature sensing element which extend out the upper nut as shown in the embodiments of FIGS. 1–7 are eliminated along with the potential thermal error introduced by the carrier tubes.

Figure 10:
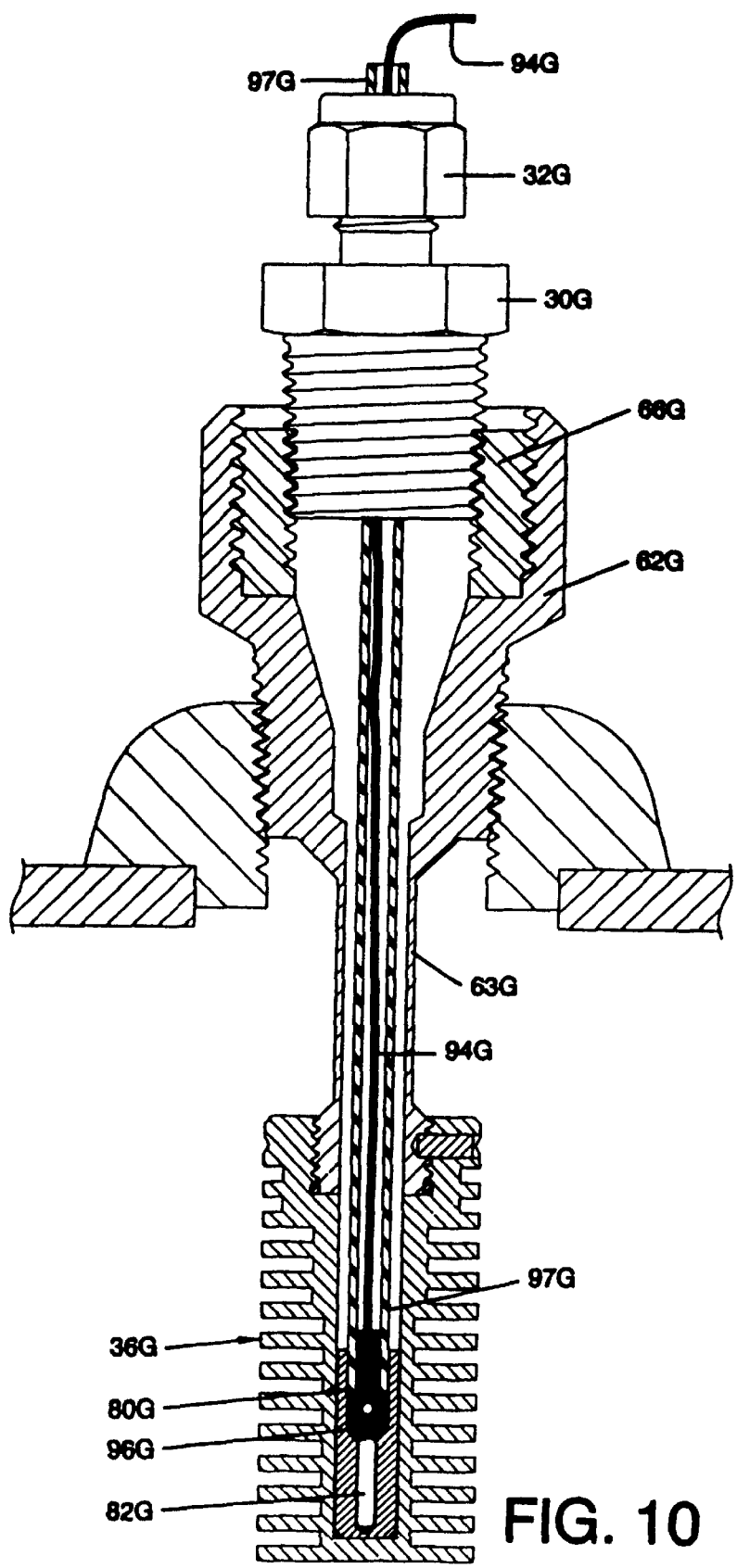
FIG. 10 is a sectional view of another embodiment of a temperature sensing assembly in which a tubular member has a lower end received within a carrier for the temperature sensing element.
Figure 11:
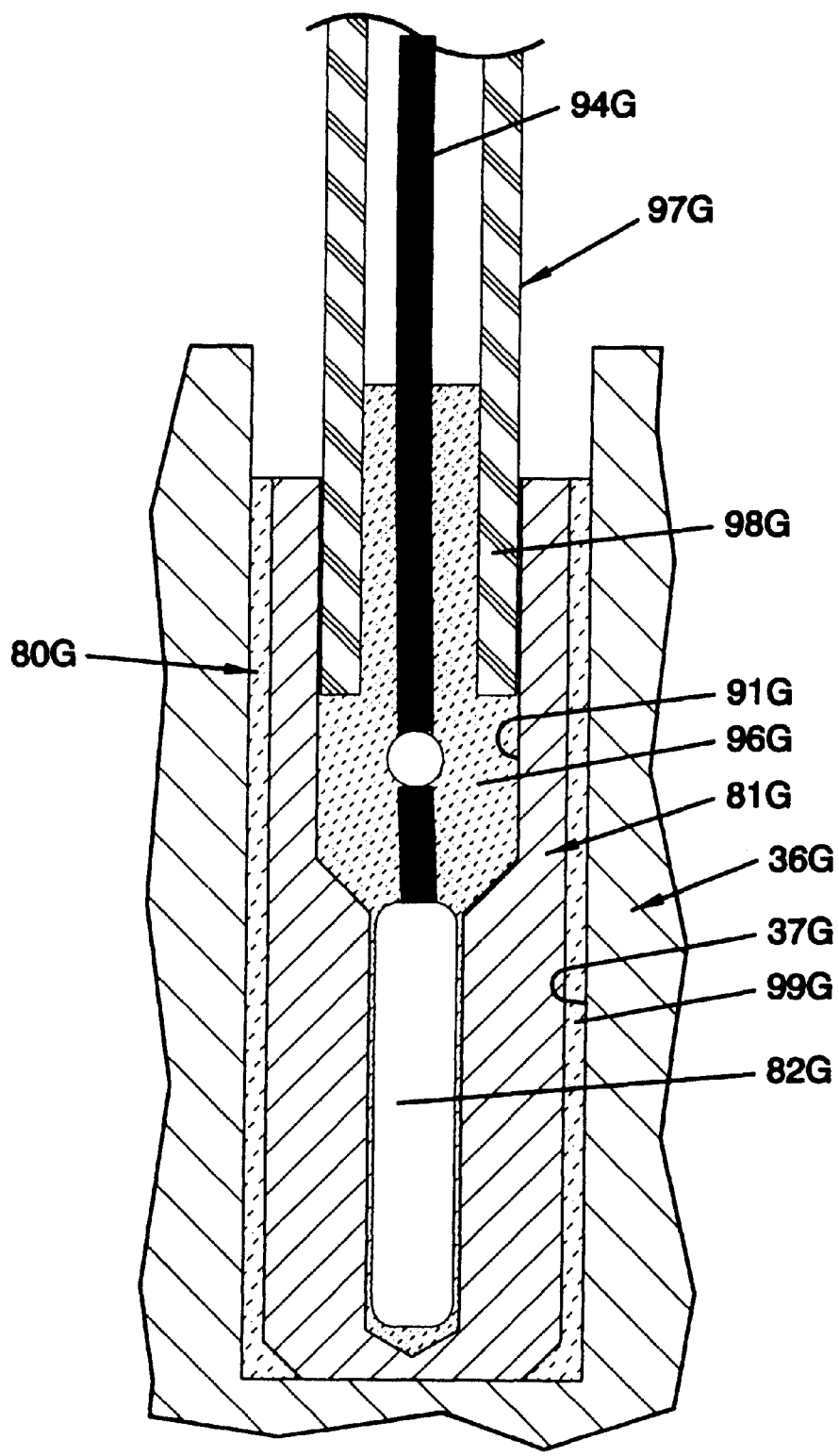
FIG. 11 is an enlarged sectional view of the temperature sensing assembly of FIG. 10 shown removed from the finned thermowell tube.

Specific Embodiment of FIGS. 10 and 11

The embodiment of the temperature sensing probe or assembly generally indicated at 80G and illustrated in FIGS. 10 and 11 is inserted within the lower end portion of internal bore 37G defining a thermowell. Temperature sensing assembly 80G includes a plastic tube or tubular member 97G having a lower end portion 98G received within enlarged bore portion 91G of carrier 81G. Wire connection 94G to temperature sensing element 82G is received within tubular member 97G and extends through a plug 30G and nut 32G similar to the embodiment shown in FIG. 2. The lower end 98G of tubular member 97G is secured by epoxy 96G within bore portion 91G as shown particularly in FIG. 11. Carrier 81G is of a cylindrical shape and is immersed in a thermally conductive fluid 99G, such as grease or a lubricant, within bore 37G of finned tube 36G to enhance thermal transfer. If desired, carrier 81G and bore 37G could be provided with suitable screw threads for mounting within bore 37G in a manner similar to the embodiment of FIGS. 8 and 9.

Tubular member 97G is secured by nut 32G and exerts a compressive force against assembly 80G to maintain assembly 80G in bore 37G against the bottom of bore 37G. Tubular member 97G also provides a guide for wire connection 94G and acts to thermally isolate temperature sensing assembly 80G particularly by extending within tubular member 63G. Tubular member 97G is preferably formed of PVC and has a low thermal conductivity between about 0.8 and 1.5 BTU/Hr/Ft$^{2°}$ F./In. For electrical isolation of temperature sensing assembly 80G, a plastic sleeve 66G formed of a dielectric material is threaded within housing 62G and engages plug 30G. Also, the embodiment of FIGS. 8 and 9 may, if desired, utilize a plastic sleeve and plug similar to plastic sleeve 66G and plug 30G of the embodiment shown in FIGS. 10 and 11. The remainder of temperature sensing assembly 80G is generally similar to temperature sensing assembly 80F shown in the embodiment of FIGS. 8 and 9.

Figure 12:
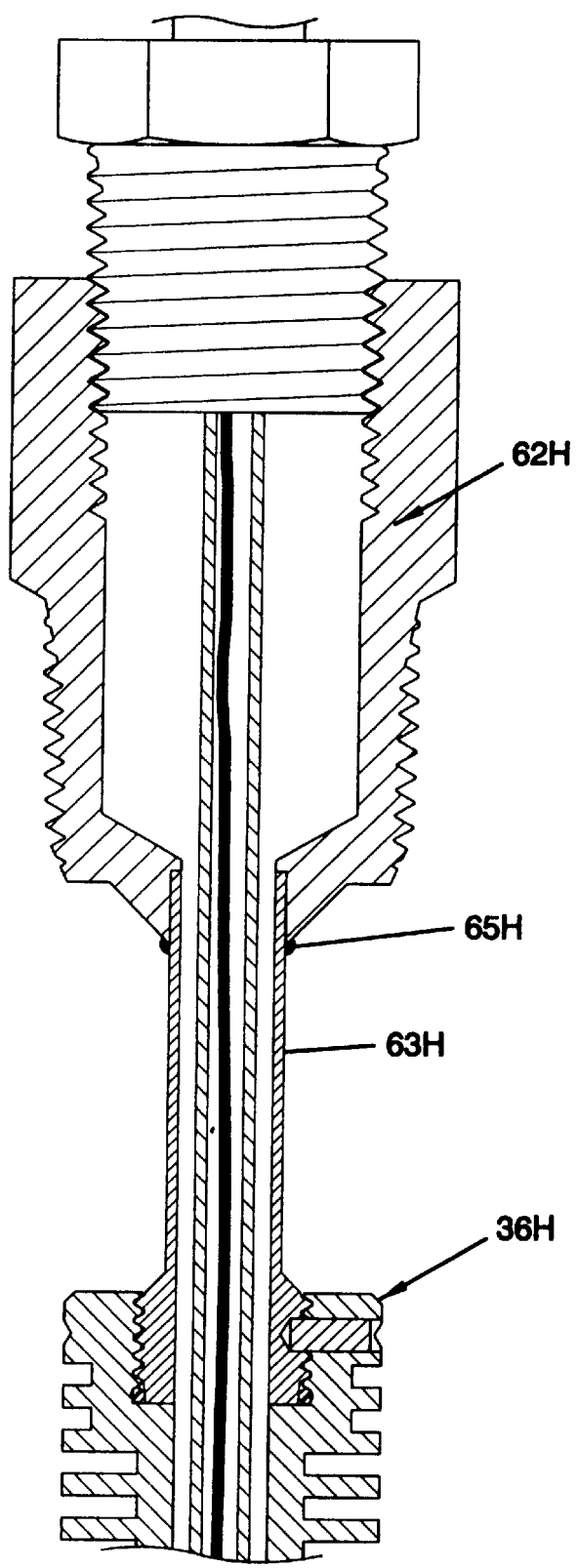
FIG. 12 is a sectional view of a two piece housing assembly for supporting the finned tube shown in the embodiment of FIGS. 10 and 11.

Specific Embodiment of FIG. 12

The embodiment of FIG. 12 discloses a two piece housing for supporting finned tube 36H which is similar to finned tube 36G shown in the embodiment of FIGS. 10 and 11. Upper housing 62H is threaded with an internally threaded opening in the conduit or pipeline in the manner shown in FIG. 10 for the embodiment of FIGS. 10 and 11. A separate housing section 63H is welded at 65H to housing 62H. Housing section 63H extends between housing 62H and finned tube 36H which is similar to finned tube 36G in the embodiment of FIGS. 10 and 11. Housing section 63H is formed of a material different from the material of housing 62H. The material has a relatively high yield strength in the range of 45 to 60 KSI and has a very low thermal conductivity between about 4 and 7 BTU/Ft. Hr/Ft$^2$/° F. A suitable material for housing section 63H is Hastelloy C-276. Upper housing 62H is preferably formed of a high alloy steel material such as 316 stainless steel and has a thermal conductivity between about 8 BTU/Ft. Hr/Ft$^2$/° F. and 10 BTU/Ft. Hr/Ft$^2$/° F. The material for housing section 63H is of a higher strength than the material for housing 62H and has a yield strength of 30 to 40 KSI. Such high strength is desirable for vibrational or high flow situations where flow rates exceed 50 meters a second and is required for a thin wall tube having a wall thickness less than about 0.060 inch over at least a major portion of its length, for example. The remainder of the thermowell assembly for the embodiment of FIG. 12 is similar to the embodiment of FIGS. 10 and 11.

While the thermowell assembly of the present invention has been illustrated and described for use with a gas pipeline, it is to be understood the thermowell assembly of the present invention may be utilized satisfactorily with flowing liquids and with various conduits other than pipelines.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. For use with a gas pipeline having gas flowing through the pipeline, a thermowell assembly for mounting within an opening in the pipeline to sense the temperature of the flowing gas and transmitting a temperature sensing signal to a flow measuring instrument for calculating the volume of gas flow along the pipeline, said thermowell assembly comprising:
    an upper metallic housing for mounting within said opening in said pipeline and forming a metallic structural connection with the pipeline;
    a closed end metallic tube for extending within said pipeline and forming a thermowell for receiving a temperature sensing element;
    a plurality of annular metallic fins about said metallic tube for thermal transfer from the gas in the pipeline to said temperature sensing element; and
    an intermediate metallic tubular member extending between and connecting said upper metallic housing to said metallic tube, said upper metallic housing having an external diameter at least about twice an external diameter of said intermediate metallic tubular member.

2. The thermowell assembly as defined in claim 1, wherein said upper metallic housing has a low thermal conductivity between about 4 and 15 BTU/Ft Hr/Ft$^2$/° F.

3. The thermowell assembly as defined in claim 1, wherein said metallic fins have an outer diameter at least about 50 percent greater than an outer diameter of said closed end metallic tube.

4. The thermowell assembly as defined in claim 1, wherein said annular metallic fins are spaced in parallel relation to each other and have an outer diameter at least about twice the outer diameter of said closed end metallic tube.

5. The thermowell assembly as defined in claim 1, wherein said metallic fins have an outer diameter slightly smaller than a diameter of said opening in said pipeline.

6. The thermowell assembly as defined in claim 1, wherein said intermediate metallic tubular member is formed of a material different from the material of said metallic tube and has a low thermal conductivity between about 4 and 15 BTU/Ft Hr/Ft$^2$/° F.

7. The thermowell assembly as defined in claim 1, further comprising:
    a hollow closed end carrier mounted internally within said thermowell of said closed end metallic tube; and
    a thermal conducting adhesive mounted within said large diameter upper bore portion over said sensing element for securing said sensing element within said small diameter lower bore portion.

8. The thermowell assembly as defined in claim 7, further comprising:
    a wire connection extending from said temperature sensing element for transmitting the sensing temperature of the flowing gas; and
    a plastic tubular member receiving said wire connection therein and having a lower end extending within said large diameter upper bore portion of said carrier, said thermal conducting adhesive securing said wire connection and said plastic tubular member within said large diameter upper bore portion of said carrier.

9. The thermowell assembly as defined in claim 1, wherein said metallic tube has a small diameter inner bore portion to receive said sensing element and a large diameter internally threaded outer bore portion, and said intermediate metallic tubular member has an externally threaded inner end portion received within and engaging said internally threaded outer bore portion.

10. The thermowell assembly as defined in claim 1, wherein said intermediate metallic tubular member connecting said upper metallic housing to said metallic tube has a thin wall thickness less than about 0.060 inch over at least a major portion of its length.

11. The thermowell assembly as defined in claim 1, wherein said intermediate metallic tubular member connecting said upper metallic housing to said metallic tube is formed of stainless steel and has a thermal conductivity between about 4 and 15 BTU/Ft Hr/Ft$^2$/° F.

12. The thermowell as defined in claim 1, further comprising:
    a temperature sensing probe including said temperature sensing element, the temperature sensing element including a resistance temperature device mounted within said thermowell.

13. The thermowell assembly as defined in claim 1, wherein said metallic tube is formed of a hard anodized aluminum having a high thermal conductivity between about 80 and 200 BTU/Ft Hr/Ft$^2$/° F.

14. The thermowell assembly as defined in claim 1, wherein said opening in said pipeline is internally threaded and said upper metallic housing is externally threaded for mounting in said internally threaded opening.

15. For use with a gas pipeline having gas flowing through the pipeline, a thermowell assembly for mounting within an opening in the pipeline and extending within the pipeline to sense the temperature of the flowing gas and transmitting a temperature sensing signal to a flow measuring instrument for calculating the volume of flow along the pipeline, said thermowell assembly comprising:
    an upper metallic housing for mounting within said opening in said pipeline;
    a hollow closed end metallic tube connected to said metallic housing for extending within said pipeline and having a cylindrical body defining a thermowell for receiving a temperature sensing element; and
    a plurality of spaced annular metallic fins about said cylindrical body for thermal transfer to said temperature sensing element from said closed end metallic tube, said fins having an outer diameter at least about 50 percent greater than an outer diameter of said cylindrical body.

16. The thermowell assembly as defined in claim 15, further comprising:

a rigid intermediate metallic tubular member extending between and rigidly connecting said upper metallic housing to said closed end metallic tube, said metallic tubular member extending within the pipeline.

17. The thermowell assembly as defined in claim 15, wherein said upper metallic housing has an external diameter at least about twice the external diameter of said intermediate metallic tubular member.

18. The thermowell assembly as defined in claim 15, wherein said metallic tubular member rigidly connecting said upper metallic housing to said metallic tube is formed of stainless steel and has a thermal conductivity between about 4 and 15 BTU/Ft Hr/Ft$^2$/° F.

19. The thermowell assembly as defined in claim 15, wherein said intermediate metallic tubular member is formed of a material different from the material of said metallic tube and has a low thermal conductivity between about 4 and 15 BTU/Ft Hr/Ft$^2$/° F.

20. The thermowell assembly as defined in claim 15, wherein said metallic tubular member rigidly connecting said upper metallic housing to said metallic tube has a thin wall thickness less than about 0.060 inch over at least a major portion of its length.

21. The thermowell assembly as defined in claim 15, wherein said metallic tube has a small diameter inner bore portion to receive said sensing element and a large diameter internally threaded outer bore portion, and said intermediate metallic tubular member has an externally threaded inner end portion received within and engaging said internally threaded outer bore portion.

22. The thermowell assembly as defined in claim 15, further comprising
a hollow closed end carrier mounted internally within said thermowell of said closed end metallic tube, said carrier having a small diameter lower bore portion and a large diameter upper bore portion with said sensing element received within said small diameter lower bore portion; and
a thermal conducting adhesive mounted within said large diameter upper bore portion over said sensing element for securing said sensing element within said small diameter lower bore portion.

23. The thermowell assembly as defined in claim 22, further comprising:
a wire connection extending from said temperature sensing element for transmitting the sensing temperature of the flowing gas; and
a plastic tubular member receiving said wire connection therein and having a lower end extending within said large diameter upper bore portion of said carrier, said thermal conducting adhesive securing said wire connection and said plastic tubular member within said large diameter upper bore portion of said carrier.

24. The thermowell assembly as defined in claim 15, wherein said metallic fins have an outer diameter slightly smaller than a diameter of said opening in said pipeline.

25. The thermowell assembly as defined in claim 15, wherein said annular metallic fins are spaced in parallel relation to each other and have an outer diameter at least about twice the outer diameter of said closed end metallic tube.

26. The thermowell assembly as defined in claim 15, further comprising:

the temperature sensing element comprising a resistance temperature device.

27. The thermowell assembly as defined in claim 15, wherein said opening in said pipeline is internally threaded and said upper metallic housing is externally threaded for mounting in said internally threaded opening.

28. A thermowell assembly for mounting within an opening in the wall of a pipeline for sensing the temperature of a gas flowing along the pipeline and transmitting a sensed temperature to a flow measuring instrument for calculating the volume of gas flow along the pipeline, said thermowell assembly comprising:
a closed end metallic tube for extending within said pipeline and forming a thermowell for sensing a temperature sensing element;
said end metallic tube having a cylindrical body and a plurality of annular metallic fins about said cylindrical body for thermal transfer to said temperature sensing element;
an upper metallic housing mounted within said opening in said pipeline and having a metallic structural connector for rigid interconnection with the pipeline;
an intermediate metallic tubular member extending between and rigidly connecting the upper metallic housing and the closed end tube; and
said fins having an outer diameter less than an external diameter of said upper metallic housing and greater than an external diameter of the intermediate metallic tubular member.

29. The thermowell assembly as defined in claim 28, wherein the outer diameter of said fins is at least about 50 percent greater than an outer diameter of said cylindrical body.

30. The thermowell assembly as defined in claim 28, further comprising:
a hollow closed end carrier mounted internally within said thermowell of said closed end metallic tube; and
a thermal conducting adhesive mounted within said large diameter upper bore portion over said sensing element for securing said sensing element within said small diameter lower bore portion.

31. The thermowell assembly as defined in claim 28, wherein the diameter of said opening in said pipeline is at least about twice the external diameter of said intermediate metallic tubular member.

32. The thermowell assembly as defined in claim 28, wherein said intermediate metallic tubular member connecting said upper metallic housing to said metallic tube is formed of stainless steel and has a thermal conductivity between about 4 and 15 BTU/Ft Hr/Ft$^2$/° F.

33. The thermowell assembly as defined in claim 32, wherein said intermediate metallic tubular member has a thin wall thickness less than about 0.060 inch over at least a major portion of its length.

34. The thermowell assembly as defined in claim 28, wherein said upper metallic housing is formed of stainless steel.

35. The thermowell assembly as defined in claim 28, further comprising:
a hollow closed end carrier mounted internally within said thermowell, said carrier being formed of an anodized aluminum material having a high thermal conductivity between about 80 and 200 BTU/Ft Hr/Ft$^2$/° F.

36. The thermowell assembly as defined in claim 28, further comprising:

the temperature sensing element including a resistance temperature device.

37. The thermowell assembly as defined in claim 28, wherein said metallic fins have an outer diameter slightly smaller than a diameter of said opening in said pipeline.

38. The thermowell assembly as defined in claim 28, wherein said annular metallic fins are spaced in parallel relation to each other and have an outer diameter at least about twice the outer diameter of said closed end metallic tube.

39. The thermowell assembly as defined in claim 28, wherein said opening in said pipeline is internally threaded and said upper metallic housing is externally threaded for mounting in said internally threaded opening.

40. A thermowell assembly for mounting within an opening in the wall of a pipeline for sensing the temperature of a gas flowing along the pipeline and transmitting the sensing temperature to a flow measuring instrument for calculating the volume of gas flow along the pipeline, said thermowell assembly comprising:

a closed end metallic tube for extending within said pipeline and forming a thermowell for receiving a temperature sensing element, said metallic tube extending a substantial distance above said temperature sensing element;

said closed end metallic tube including a plurality of annular metallic fins about a fin body for thermal transfer to said temperature sensing element;

an upper metallic housing for mounting within said opening in said pipeline and forming a metallic structural connection with both the pipeline and the closed end metallic tube; and said fins being in spaced parallel relation to each other about said fin body and extending along substantially the entire length of said closed end metallic tube alongside and above said temperature sensing element.

41. The thermowell assembly as defined in claim 40, further comprising:

an intermediate metallic tubular member extending between and rigidly connecting said upper metallic housing and said closed end metallic tube, said intermediate tubular member being of an external diameter substantially smaller than the outer diameter of said closed end metallic tube.

42. The thermowell assembly as defined in claim 40, wherein said upper metallic housing and said intermediate metallic tubular member are formed of stainless steel.

43. A thermowell assembly as defined in claim 40, wherein the diameter of said opening in said pipeline is at least about twice the external diameter of said intermediate metallic tubular member.

44. The thermowell assembly as defined in claim 40, wherein said fins have an outer diameter at least about 50 percent greater than an outer diameter of said body.

45. The thermowell assembly as defined in claim 40, wherein said metallic fins have an outer diameter slightly smaller than a diameter of said opening in said pipeline.

46. The thermowell assembly as defined in claim 40, wherein said annular metallic fins are spaced in parallel relation to each other and have an outer diameter at least about twice the outer diameter of said closed end metallic tube.

47. The thermowell assembly as defined in claim 40, wherein said opening in said pipeline is internally threaded and said upper metallic housing is externally threaded for mounting in said internally threaded opening.

48. The thermowell assembly as defined in claim 40, further comprising:

a hollow closed end carrier mounted internally within said thermowell of said closed end metallic tube; and a thermal conducting adhesive mounted within said large diameter upper bore portion over said sensing element for securing said sensing element within said small diameter lower bore portion.

49. A method of sensing the temperature of gas flowing along a pipeline and transmitting the sensed temperature to a flow measuring instrument for calculating the volume of gas flowing along the pipeline, said method comprising:

providing a metallic closed end temperature transfer tube having a body and defining a thermowell for receiving a temperature sensing element;

providing a plurality of spaced metallic fins about said body, said fins extending a substantial distance above said temperature sensing element for thermal transfer of gas in said pipeline to said temperature sensing element; and mounting an upper metallic housing within an opening in said pipeline to form a metallic structural connection with the pipeline, the metallic housing having a rigid connection to said closed end transfer tube.

50. The method as defined in claim 49, wherein providing said plurality of metallic fins about said body includes providing metallic fins having an outer diameter at least about 50 percent greater than an outer diameter of said closed end metallic tube.

51. The method as defined in claim 49, further comprising:

providing an intermediate metallic tubular member between said upper metallic housing and said closed end transfer tube for rigidly connecting said upper metallic housing to said closed end transfer tube.

52. The method as defined in claim 51, wherein providing said intermediate metallic tubular member between said upper metallic housing and said closed end metallic tube includes providing an intermediate metallic tubular member having an external diameter less than about ½ a diameter of said opening in said pipeline.

53. The method as defined in claim 51, further comprising:

positioning a temperature probe within the thermowell, the temperature sensing probe including a resistance temperature device.

54. The method as defined in claim 51, wherein mounting the upper metallic housing within the opening in said pipeline includes threading an external thread on the upper metallic housing with an internal thread in the opening in the pipeline.

55. The method as defined in claim 49, wherein said metallic fins about said body have an external diameter slightly smaller than a diameter of said opening in said pipeline.

56. For use with a gas pipeline having gas flowing through the pipeline, a thermowell assembly for mounting within a threaded opening in the pipeline to sense the temperature of the flowing gas and transmitting a temperature sensing signal to a flow measuring instrument for calculating the volume of gas flow along the pipeline, said thermowell assembly comprising:

an upper metallic housing including an external thread for mounting within said threaded opening in said pipeline and forming a metallic structural connection with the pipeline;

a hollow closed end metallic tube for extending within said pipeline and forming a thermowell for receiving a temperature sensing element;

a plurality of annular metallic fins about said metallic tube for thermal transfer from the gas in the pipeline to said temperature sensing element; and an intermediate metallic tubular member extending between and structurally connecting said upper metallic housing to said metallic tube.

57. The thermowell assembly as defined in claim 56, further comprising:

the temperature sensing element including a resistance temperature device for positioning within the thermowell.

58. The thermowell assembly as defined in claim 56, wherein said metallic fins have an outer diameter slightly smaller than a diameter of said opening in said pipeline.

59. The thermowell assembly as defined in claim 56, wherein said annular metallic fins are spaced in parallel relation to each other and have an outer diameter at least about twice an outer diameter of said closed end metallic tube.

60. The thermowell assembly as defined in claim 56, wherein said annular metallic fins are spaced in parallel relation to each other and have an outer diameter at least about twice the outer diameter of said closed end metallic tube.

61. The thermowell assembly as defined in claim 56, further comprising:

a hollow closed end carrier mounted internally within said thermowell of said closed end metallic tube; and a thermal conducting adhesive mounted within said large diameter upper bore portion over said sensing element for securing said sensing element within said small diameter lower bore portion.

62. The thermowell assembly as defined in claim 56, further comprising:

a temperature sensing probe including said temperature sensing element, the temperature sensing element including a resistance temperature device mounted within said thermowell.

\* \* \* \* \*